April 1, 1924.

H. B. BARNES

Re. 15,803

AUDIBLE INDICATING DEVICE

Original Filed Oct. 10, 1914

2 Sheets-Sheet 1

Inventor:
HAROLD B. BARNES,
by John H. Bruninga
His Attorney.

April 1, 1924. Re. 15,803

H. B. BARNES

AUDIBLE INDICATING DEVICE

Original Filed Oct. 10, 1914 2 Sheets-Sheet 2

Inventor:
HAROLD B. BARNES,

By John H. Bruninga
His Attorney

Reissued Apr. 1, 1924. Re. 15,803

UNITED STATES PATENT OFFICE.

HAROLD B. BARNES, OF DENVER, COLORADO.

AUDIBLE INDICATING DEVICE.

Original No. 1,243,915, dated October 23, 1917, Serial No. 866,106, filed October 10, 1914. Application for reissue filed October 23, 1919. Serial No. 332,842.

*To all whom it may concern:*

Be it known that I, HAROLD B. BARNES, a citizen of the United States, and residing at Denver, in the county of Denver, in the State of Colorado, have invented the new and useful Improvement in Audible Indicating Devices, of which the following is a specification.

This invention relates to electric switches. The employment of switches for certain purposes and in certain locations renders difficult the determination of the conditions of the circuit which the switch controls. This is especially true of hand switches, such as snap switches, which are enclosed or encased and which when placed in positions where they cannot be readily observed, renders the determination of the position of the switch contacts difficult, if not impossible, even where the usual visual indicating means is employed.

Examples of such switch conditions are found in electric heating devices in which the opening or closing of the circuit does not have a visual effect; the remote control of lights where the lights are not visible at the switch, as where the light is in the basement and the switch is at the head of the steps; the control of fans where the switch is so high that the visual indicating means is not observable under ordinary conditions.

In all of these cases, it is obviously desirable that it be readily determinable whether the switch is "on" or "off".

In some classes of current consuming devices, such as heating devices and fans, multi-point switches are required.

In the case of a range heater, it is desired to increase or decrease the applied heat by the three-heat switch usually provided for that purpose. The operator or user has, however, no means of noting the degree of heat applied, except by an examination of the switch handle or manipulative element, which is inconveniently located for such examination (necessarily so, as to provide mechanical protection for the switch), even assuming that sufficient light is available to make the usual visual indicator of the switch visible.

On ceiling fans, which usually have several degrees of speed, the visual indicator on the switch, which is usually placed eight or more feet from the floor, is practically invisible; the operator must under these conditions experiment with the switch until he learns from the result of the operation, whether or not he has what he wants; to experiment, of course, takes considerable time as the momentum of the moving parts of such a fan is so great that speed changes, especially slow downs, take place very gradually.

One of the objects of this invention, therefore, is to provide an electric switch of the character described, which is provided with mechanism adapted upon the operation of the manipulative element to audibly indicate the shifted position of the switch.

Another object is to provide an electric switch of the character described, in which the contacts are movable to different selected positions and which is provided with mechanism to selectively indicate audibly such different selected positions.

Further objects will appear from the detail description, taken in connection with the accompanying drawing, in which.

In accordance with this invention, the switch has provisions for emitting a distinct sound or sounds, corresponding to a certain position or positions of the switch contacts; such a sound may be a musical note (as emitted by a reed or tuning fork) or a click or buzz (such as is emitted by the clicking of a reed over a toothed surface). In case of a simple two-point switch, the sound is produced in "off" position, but may be produced in both the "on" and "off" positions, in which case, the tone or pitch of the sounds may vary. In case of a multi-point switch, there may be in addition to the sound for the "off" position, a sound for each of the "on" positions; in such a case, the sounds for the different selected positions are distinctive in pitch or tone to correspond selectively to the different positions of the switch contacts.

Figure 1:
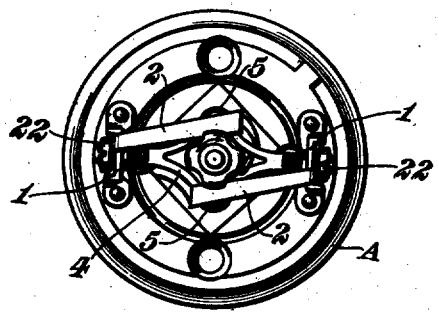
Figure 1 is a top plan view of an ordinary two-point snap switch with the cover and manipulative element removed, and showing one embodiment of this invention.
Figure 2:
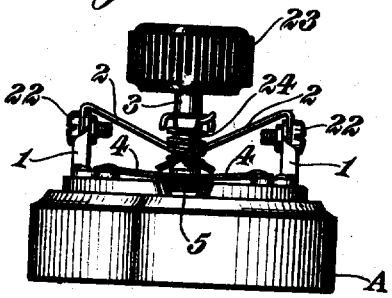
Figure 2 is an elevation of Figure 1.

Referring now to the accompanying drawings and more particularly to Figures 1 and 2, A represents the base of the switch which, as is usual is of insulating material and which has mounted thereon posts 1 provided with the usual screws 22 for receiving the wires. Mounted on the base 1 is a stem 3 provided with a manipulative element or knob 23 and which has mounted on its lower end a movable contact element 4 provided at its ends with contacts, adapted to cooperate with corresponding contacts on the posts 1. A spring 24 encircles the posts in order to move the contacts into and out of snapping engagement and in order to cause the quick make and break. It is, of course, understood that the switch is as usual provided with a dished cover through which the stem 3 projects, the knob or manipulative element 23 being arranged outside of the case or cover; in view of the fact, however, that snap switches of the type shown are well known in the art, further description thereof will be unnecessary.

Arranged on an axis at right angles to the movable switch contacts and on the movable switch element are rivets 5. These rivets are, however, suitably insulated from the movable switch element in a manner well known to those skilled in the art, as by washers and bushings as is also shown in Figure 2. The heads of the rivets 5 are rounded so as to form rounded protuberances on the upper face of the movable switch element 4 but insulated therefrom. Mounted on the posts are springs or reeds 2 and these reeds extend downwardly to engage and be in the path of the heads of the rivets 5. The locations of these reeds is such that when the switch is in "on" position, as shown in Figures 1 and 2, the ends of these reeds will be engaged by the rivet heads, but when the switch is in "off" position, both the reeds will be disengaged and will be out of contact with the rivet heads.

As is well known, in the operation of snap switches, such as shown in Figures 1 and 2, the movement of the manipulative element tensions the spring connecting the manipulative element with the movable switch element and accordingly, the switch contacts engage and disengage with a snap. Assuming the switch to be in "on" position, as shown in Figure 1, when the manipulative element or knob 23 is moved in the direction of the arrow, Figure 1, i. e., in the usual right hand direction, the spring 24 will be placed under tension and the movable switch element 4 will move through a right angle with a quick snap motion so as to cause the rivet heads to raise the ends of the reeds 2 and then quickly disengage therefrom, thereby causing the reeds to vibrate and emit a distinct musical note; when, however, the switch is moved to "on" position, the rivet heads will move against the reeds and while this will also cause vibration of these reeds, the sound will be deadened due to the fact that the vibrations of the reeds will be immediately interrupted and will only be slight at that. Therefore, the movement of the switch to "off" position will give a distinct musical sound, while the movement to "on" position will give a dull sound; in this way, the "off" and "on" positions of the switch can be readily determined by the difference in the sounds.

Figure 3:
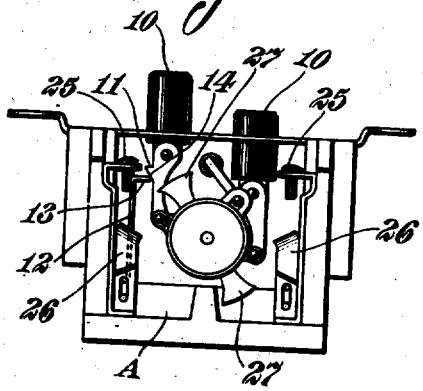
Figure 3 is a side elevation of a flush or push button switch, showing another embodiment of this invention.
Figure 4:
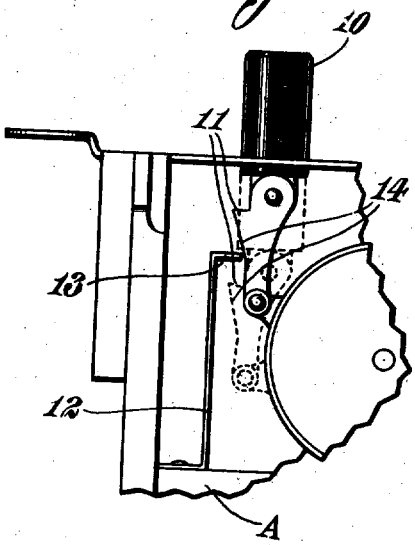
Figure 4 is an enlarged detail of Figure 3.

Figures 3 and 4 show another embodiment of this invention as applied to snap switches of the flush or push button type. This switch is of usual construction, the base A having binding posts 25 leading to contacts 26 with which cooperate the movable contacts 27 operated by the push buttons 10. In this type of switch, the movable switch element is also moved to "on" and "off" positions with a quick snapping movement, the switch being shown in "off" position in Figure 3.

The link connecting the "on" push button with the movable switch element is provided with a tooth providing cam surfaces 11 and 14 in the path of which is arranged the angular portion 13 of a reed or spring 12 mounted on the base A.

When the "on" button 10 is pushed in (from full to dotted lines, Figure 4) the cam surface 14 will engage the end 13 of the reed 12 and thereafter release the same so as to cause free vibration of the reed when the switch contacts are engaged, to emit a clear musical sound. When the switch is moved to "off" position by the depression of the other button, the cam face 11 engages and then releases the end 13 of the reed thereby causing it to again vibrate; but this vibration is dampened, due to the fact that the end 13 in striking against the face 14 has its vibration retarded and, therefore, dampened so as to emit a dull sound. In this construction, therefore, a clear musical note is emitted when the switch contacts are closed, while a dull sound is emitted when the switch contacts are opened.

Figure 5:
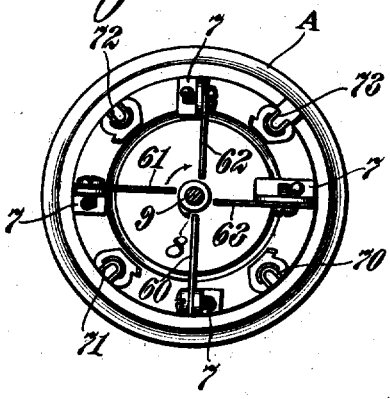
Figure 5 is a plan of a four-point snap switch, the cover and movable switch contacts being removed, and showing another embodiment of this invention.

In Figure 5 is shown the application of this invention to a four-point switch having three "on" positions and one "off" position. The switch itself may be of any suitable construction well known to those skilled in the art, the stationary contacts on the base being shown at 70, 71, 72 and 73, while the movable contacts (not shown) are connected with the stem 9 to which the manipulative element is connected. In view of the fact that switches of this type are well known, further detail description of the switching mechanism is not necessary.

Mounted on the base A are posts or brackets 7 to which are fixed reeds 60, 61, 62 and 63 corresponding to the "off" position of the switch and the three "on" positions thereof respectively. As shown in Figure 5, the reeds are progressively of different lengths so as to emit musical sounds of different progressive pitches. Fixed to the stem 9 is a cam projection 8 which moves in the direction of the arrow with the stem when the manipulative element is moved in the usual right hand direction to successively position the switch contacts. The cam projection 8 is adapted to successively wipe over the ends of and successively release the reeds 60, 61, 62 and 63, and when each reed is released, it emits its own distinctive musical sound.

In the operation of the switch when the manipulative element connected with the stem is moved to "on" position, the cam projection 8 will by engagement with the reed 61 and immediate release thereof (the parts shown in Figure 5 being with the switch in "off" position), cause the reed 60 to vibrate and emit a distinct musical sound. Similarly the positioning of the switch contacts by the manipulative element to the different "on" positions will cause the emission of distinctive sounds for each "on" position of the switch. The operator can, therefore, determine the position of the switch contacts by the nature of the sound emitted.

Figure 6:
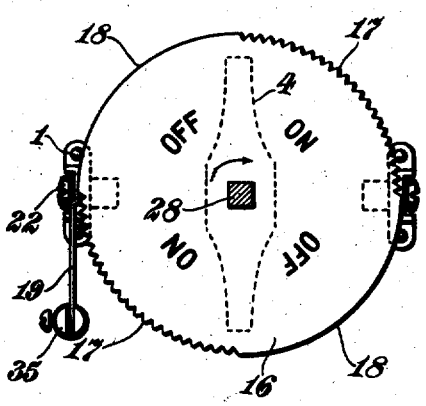
Figure 6 is a plan, somewhat diagrammatic in form, of a two-point snap switch, but showing still another embodiment of this invention.

Figure 6 shows another embodiment of this invention as applied more particularly to a two-point snap switch such as shown in Figures 1 and 2. In this embodiment, the posts 1, the screws 22 and the movable switch element 4 may be of any usual construction such as shown in Figures 1 and 2. The stem connected with the movable switch element has in this case mounted thereon to rotate therewith a disc 16 which may be the usual indicating disc provided as usual with "off" and "on" designations observable through a window in the casing or cover. This disc may, however, be of slightly greater diameter than the usual disc used for visual indicating purposes and the periphery is provided with teeth 17, these teeth being shown in Figure 6 in two sets opposite the "on" positions, while the periphery is left smooth opposite the "off" position as shown at 18. A reed or spring 19 is fixed at its end to a post on the switch base and is bent to engage the periphery of the disc so as to contact with either the toothed or smooth portions thereof.

In the operation of this switch, when the manipulative element is operated to move the contacts to "on" position, the toothed portion 17 will move quickly past the end of the reed or spring and cause a buzzing noise; while when the switch is moved to "off" position, there will be no noise emitted, due to the fact that the reed at this time engages the smooth portion 18 of the disc. The operator can, therefore, readily determine the "on" and "off" position by the audible indicating means provided.

Figure 7:
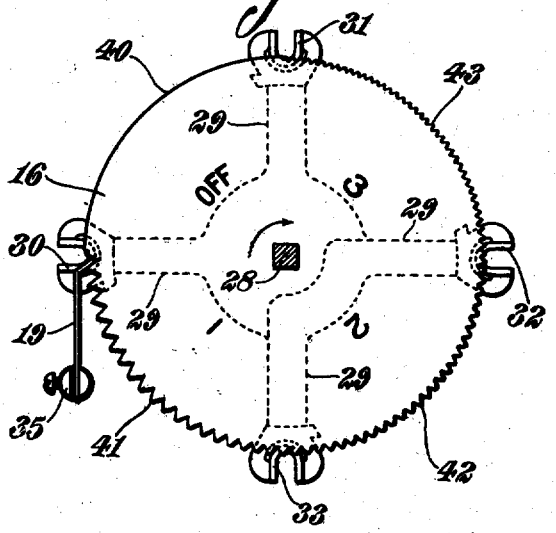
Figure 7 is a view, somewhat diagrammatic in form, of a four-point snap switch, showing still another embodiment of this invention.

Figure 7 shows an embodiment of this invention as applied to a four point snap switch. In this embodiment, the switch may be of any suitable form, stationary contacts being as shown at 30, 31, 32 and 33 while the movable contacts are shown at 29. These movable contacts are mounted and moved with the stem 28 in order to successively position the movable contacts to "off" and the three successive "on" positions.

The disc 16 mounted to move with the stem of the movable switch element and the manipulative element, is provided with the usual "off" and "1", "2", and "3" "on" positions which are observable through an opening or window in the usual enclosing casing or cover for the switch. The periphery of the disc is provided with a smooth portions 41, 42 and 43 opposite the "off" position and with toothed portion 41 opposite the "1", "2", and "3" on positions, and the periphery of the disc is again adapted to be engaged by the reed 19 of the same construction as shown and described in Figure 6. The sets of teeth vary in size corresponding coarse teeth 41, medium teeth 42 and fine teeth 43.

In the operation of this switch when the movable switch contacts are successively moved to the "on" positions, the reed 19 by engagement with the disc will be vibrated, and the period of vibration will correspond to the coarseness or fineness of the teeth. Thus, when the switch is turned to "off" position there will be no vibration at all. When it is moved to first position, the teeth 41 will cause a coarse vibration while when the switch is moved to the second and third positions, the vibration will be medium and fine, respectively. The operator can, therefore, at any time by the sound emission determine the position to which the switch is being or has been moved.

Figure 8:
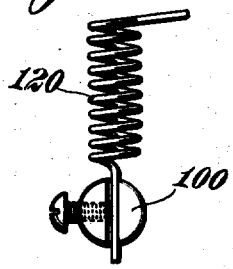
Figures 8, 9 and 10 are details showing different forms of audible or sound producing elements.
Figure 10:
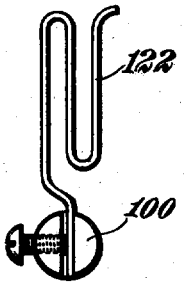
Figure 9:
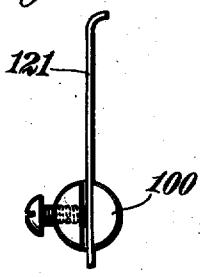

Figures 8, 9 and 10 show different forms of reeds which may be used. Thus Figure 8 shows a reed in the form of a coiled spring fixed at its end in a post 100 adapted to be mounted on the base of the switch; Figure 9 shows a reed similarly mounted but which is straight and has a curved end; while Figure 10 shows a reed similarly mounted but of reentrant form and provided with a curved end.

It will, therefore, be seen that the invention accomplishes its objects. Mechanism is provided whereby upon operation of the manipulative element of a switch, a tappet operates the sounding mechanism heretofore described to audibly indicate the different shifted positions of the switch contacts. Accordingly, the switch can be intelligently operated in the dark where the visual indicating means or switch cannot be visually observed. In two-point switches only one position need be indicated, although it is in some cases desirable that both positions be indicated. In the use of multipoint switches, which are more especially adapted for heating devices, electric fans and the like requiring different heat, speeds, etc., and in which it is desirable to indicate a number of switch positions, the operator will soon become accustomed to the different sounds emitted so that the audible indication will definitely indicate the shifted position of the switch contacts.

It is obvious that various changes may be made in the details of construction without departing from the spirit of this invention; it is, therefore, to be understood that this invention is not to be limited to the specific construction shown and described.

Having thus described the invention, what is claimed is:

1. An electric switch of the character described having switch contacts and a manipulative element adapted to shift the contacts to different positions, characterized by the provision of mechanism, cooperating with the contacts and the element, adapted upon operation of the element, to selectively indicate audibly the different shifted positions of the contacts.

2. An electric switch of the character described having switch contacts movable to different selected positions and a manipulative element adapted to shift the contacts, characterized by the provision of mechanism, cooperating with the contacts and the element, adapted upon operation of the element to shift the contacts to the different selected positions, to selectively indicate audibly such selected positions.

3. An electric switch of the character described having switch contacts movable to different selected positions and a manipulative element adapted to shift said contacts, characterized by the provision of mechanism, cooperating with the element, adapted to selectively produce sounds of different pitches in accordance with the shifted positions of the contacts.

4. An electric switch of the character described having switch contacts movable to different selected positions and a manipulative element adapted to shift said contacts, characterized by the provision of means for producing sounds of different pitches, and means cooperating therewith and with the element, adapted to produce a sound of a selected pitch when the switch contacts are moved to a selected position.

5. An electric switch of the character described having switch contacts movable to different selected positions and a manipulative element adapted to shift said contacts, characterized by the provision of a series of sound producing elements, and means cooperating with the manipulative element, adapted to sound a selected element when the switch contacts are moved to a selected position.

6. An audible indicating device for switches, comprising a stem adapted to be moved to different positions, engaging means on said stem, vibratory means rigidly supported and capable of being engaged by said engaging means so arranged that as the stem moves to a different position the engaging means will release said vibratory means so that it will be permitted to vibrate freely upon its support.

7. An audible indicating device for switches comprising a stem rotatable in one direction with a step by step movement adapted to be moved to different positions, engaging means on said stem, vibratory means rigidly supported and capable of being engaged by said engaging means so arranged that as the stem moves to a different position the engaging means will be permitted to vibrate freely upon its support and thus to indicate audibly the position of said stem.

Signed at Denver, in the county of Denver, State of Colorado, this 23rd day of Aug., 1919.

HAROLD B. BARNES.